US006044250A

United States Patent [19]

Kuramatsu et al.

[11] Patent Number: 6,044,250

[45] Date of Patent: Mar. 28, 2000

[54] WIRELESS SELECTIVE CALL RECEIVER IN WHICH DISPLAY IS CHANGEABLE IN RECEPTION WAIT STATE

[75] Inventors: Miyuki Kuramatsu; Hiroyasu Kuramatsu, both of Shizuoka, Japan

[73] Assignee: NEC Corporation, Tokyo, Japan

[21] Appl. No.: 08/870,969

[22] Filed: Jun. 6, 1997

[30] Foreign Application Priority Data

Jun. 21, 1996 [JP] Japan .................................... 8-162130

[51] Int. Cl.$^{7}$ ........................................................ H04B 1/04

[52] U.S. Cl. .................... 455/130; 455/38.4; 340/825.44

[58] Field of Search .................................. 455/32.1, 38.2, 455/38.4, 512, 67.1, 130; 340/825.44

[56] References Cited

U.S. PATENT DOCUMENTS

| | | | |
|---|---|---|---|
| 4,536,761 | 8/1985 | Tsunoda et al. | 455/38.4 |
| 5,396,650 | 3/1995 | Terauchi | 455/38.4 |
| 5,436,619 | 7/1995 | Yun | 340/825.44 |
| 5,495,344 | 2/1996 | Callaway, Jr. et al. | 455/38.4 |
| 5,774,061 | 6/1998 | Kudoh | 455/38.4 |

FOREIGN PATENT DOCUMENTS

| | | |
|---|---|---|
| WO 89/06464 | 7/1989 | WIPO . |
| WO 89/06478 | 7/1989 | WIPO . |

OTHER PUBLICATIONS

"Pocket Bell Handbook", by NTT DoCoMo, Oct. 1995.

"PA*PY–26* Information Display Pager Instruction Manual", by NEC Corporation, 1995.

*Primary Examiner*—Reinhard J. Eisenzopf
*Assistant Examiner*—Sam Bhattacharya
*Attorney, Agent, or Firm*—Scully, Scott, Murphy & Presser

[57] ABSTRACT

In a wireless selective call receiver, a display section displays a screen display data inputted thereto. A screen display data storage section stores a plurality of screen display data which are to be displayed in a reception wait state. The control section inputs a new screen display data from an external device and writes the other screen display data in the screen display data storage section. The control section outputs one of the plurality of screen display data which is selected in accordance with a current time and display start times, to the display section.

19 Claims, 9 Drawing Sheets

Fig. 6

| | C1 | C2 |
|---|---|---|
| R1 | 6:30 | TABLE CLOCK |
| R2 | 9:30 | CALENDAR |
| R3 | 17:00 | ILLUSTRATION |
| | | |
| | | |
| | | |

WIRELESS SELECTIVE CALL RECEIVER IN WHICH DISPLAY IS CHANGEABLE IN RECEPTION WAIT STATE

Background of the Invention

1. Field of the Invention

The present invention relates to a wireless selective call receiver, and more particularly, to a wireless selective call receiver capable of performing a predetermined screen display in a reception wait state.

2. Description of the Related Art

A conventional wireless selective call receiver displays only a current time or one character data stored in advance on a display unit while in a reception wait state, as shown in a "POCKET BELL HANDBOOK" of NTT DoCoMo.

FIG. 1 is a block diagram illustrating the circuit structure of the conventional wireless selective call receiver. In FIG. 1, the conventional wireless selective call receiver is composed of an antenna 10, a receiving circuit 12, a decoder 14, an operation unit 16, a control unit 18 including a switch circuit 18a, a display unit 20, a random access memory (RAM) 22, and a read only memory (ROM) 24.

The antenna 10 receives a radio call signal. The receiving circuit 12 demodulates the radio call signal received by the antenna 10 to convert into a digital signal. The decoder 14 extracts a message signal from the digital signal converted by the receiving circuit 12 to output to a control unit 18. Also, the decoder 14 inputs an operation signal from the operation unit 16 and decodes it to output this operation signal to the control unit 18 as an operation data. The operation unit 16 is operated by a user and outputs the operation signal to the decoder 14 in accordance with the operation by the user. For example, the operation unit 16 is used to set a time.

The control unit 18 controls various operations of the above wireless selective call receiver. When the message signal is outputted from the decoder 14, the control unit 18 stores this message signal in the RAM 22. The control unit 18 includes the switching circuit 18a for controlling the switching of display contents on a display unit 20 which includes a liquid crystal panel. This switching circuit 18*a* switches the screen display among a reception wait display in the reception wait state, a message display for displaying a message when the message is received, and an input screen display which is displayed when the user operates the operation unit 16. Also, the control unit 18 reads the message signal which has been written in the RAM 22 and reads the image data corresponding to the read message signal from the ROM 24 to output to the display unit 20. The above operation is performed based on various programs stored in the ROM 24. Further, the control unit 18 includes a clock section which is not illustrated in the figure for counting a time.

The RAM 22 stores the above-mentioned message signal and, in addition, stores a character string which is to be displayed on the display unit 20 when in the reception wait state. The character string is stored advance by operating the operation unit 16 by the user. Also, the ROM 24 stores various programs used to control the operation of the wireless selective call receiver in addition to the image data of the above character string.

In the above structure, when a radio call signal is not being received by the antenna 10 such that a message signal is not outputted from the decoder 14, the switching circuit 18*a* switches the screen display of the display unit 20 to the reception wait display. The control unit 18 reads image data from the ROM 24 based on the current time of the clock section. For example, if the current time is 2:30, the image data of "2", ":", "3", and "0" are read out from the ROM 24, and produces a character string image data of "2:30" to output to the display unit 20.

In the state in which the reception wait display is performed on the display unit 20, when a radio call signal is received by the antenna 10, the decoder 14 extracts a message from the digital signal which is outputted from the receiving circuit 12, and outputs the extracted message signal to the control unit 18. The control unit 18 first stores this message signal in the RAM 22. Next, the switching circuit 18*a* switches the screen display of the display unit 20 to the message display.

Next, the control unit 18 searches the ROM 24 for image data of characters based on the message signal which has been stored in the RAM 22, to produce a character string image data. Then, the control unit 18 outputs the character string image data to the display unit 20. When the screen display of the display unit 20 is set to the message display, the switching circuit 18*a* switches the screen display to the reception wait display, if a predetermined time period elapses. Also, when the character string which is to be displayed in the reception wait state is stored in the RAM 22, the control unit 18 reads out the character string to output to the display unit 20.

By the way, in the conventional wireless selective call receiver, only a current time or a character string which has been stored in advance in the RAM 22 is displayed on the display unit 20 in reception wait state. Therefore, no device is not accomplished to provide the contents displayed on the display unit as a part of the design on the outer appearance of the receiver.

In recent years, the wireless selective call receiver is demanded to have a display unit of a large screen size. Thus, the ratio of the screen of the display unit to the whole of wireless selective call receiver becomes large. In other words, because the beauty of the outer appearance of the wireless selective call receiver depends mainly on the contents displayed on the display unit, the contents displayed on the display unit become a very important element on the outward appearance.

SUMMARY OF THE INVENTION

The present invention is accomplished in light of the above circumstances. An object of the present invention is to provide a wireless selective call receiver which has an attractive outer appearance by incorporating the contents displayed on the display unit in a reception wait state as a part of the outer appearance design.

In order to achieve an aspect of the present invention, a wireless selective call receiver includes a display section for displaying a screen display data inputted thereto, a screen display data storage section for storing a plurality of screen display data which are to be displayed in a reception wait state, a control section for outputting a selected one of the plurality of screen display data to the display section. The control section inputs another screen display data from an external device and writes the other screen display data in the screen display data storage section.

The wireless selective call receiver further includes a clock section for counting time to output a current time. When each of the plurality of screen display data is associated with a time period, alternatively referred to as a time zone, the control section selects the one of the plurality of screen display data in accordance with the time zones and the current time and outputs the selected screen display data to the display section. That is, the wireless selective call receiver includes a reserving section for storing the time zone associated with each of the plurality of screen display data, and a comparing section for comparing each of the time zones stored in the reserving section and the current time supplied from the clock section, and generating a selection signal when the current time is contained within one of the time zones stored in the reserving section. The control section selects the one of the plurality of screen display data which is associated with the time zone in which the current time is contained, in response to the selection signal and outputs the selected screen display data to the display section.

In order to edit the time zone, the wireless selective call receiver further includes an operation section for generating a data designating signal and a time zone edition signal in accordance with an operation of the operation section by a user. In this case, the control section edits the time zone associated with one of the plurality of screen display data which is designated in accordance with the data designating signal, in response to the time zone edition signal.

In order to display a desired screen display data regardless of the screen display data currently displayed, the wireless selective call receiver further includes an operation section for generating a data designating signal and a display signal in accordance with an operation of the operation section by a user. In this case, the control section selects the one of the plurality of screen display data in accordance with the data designating signal and outputs the selected screen display data to the display section in response to the display signal.

In order to edit the screen display data, the wireless selective call receiver further includes an operation section for generating a data designating signal and a data edition signal in accordance with an operation of the operation section by a user. In this case, the control section selects the one of the plurality of screen display data in accordance with the data designating signal and edits the selected screen display data in response to the data edition signal.

In order to achieve another aspect of the present invention, a method of displaying a desired screen display data in a wireless selective call receiver, includes the steps of:

receiving a message signal in a message receiving mode to display a message corresponding to the received message signal on a display unit;

previously providing a plurality of screen display data; and displaying a selected one of the plurality of screen display data on the display unit in a reception waiting mode.

In order to achieve still another aspect of the present invention, a wireless selective call receiver includes a display section for display data inputted thereto, a receiving section for receiving a message signal in a message receiving mode, a storing section for storing a plurality of screen display data, and a control section for outputting a message data corresponding to the received message signal on the display section in the message receiving mode, and outputting a selected one of the plurality of screen display data to the display section in a reception waiting mode.

BRIEF DESCRIPTION OF THE DRAWINGS

FIG. 6 is a table illustrating an example of the contents which has been stored in a screen reserving section 30*b;*

DESCRIPTION OF THE PREFERRED EMBODIMENTS

A wireless selective call receiver of the resent invention will be described below in detail with reference to the accompanying drawings.

Figure 1:
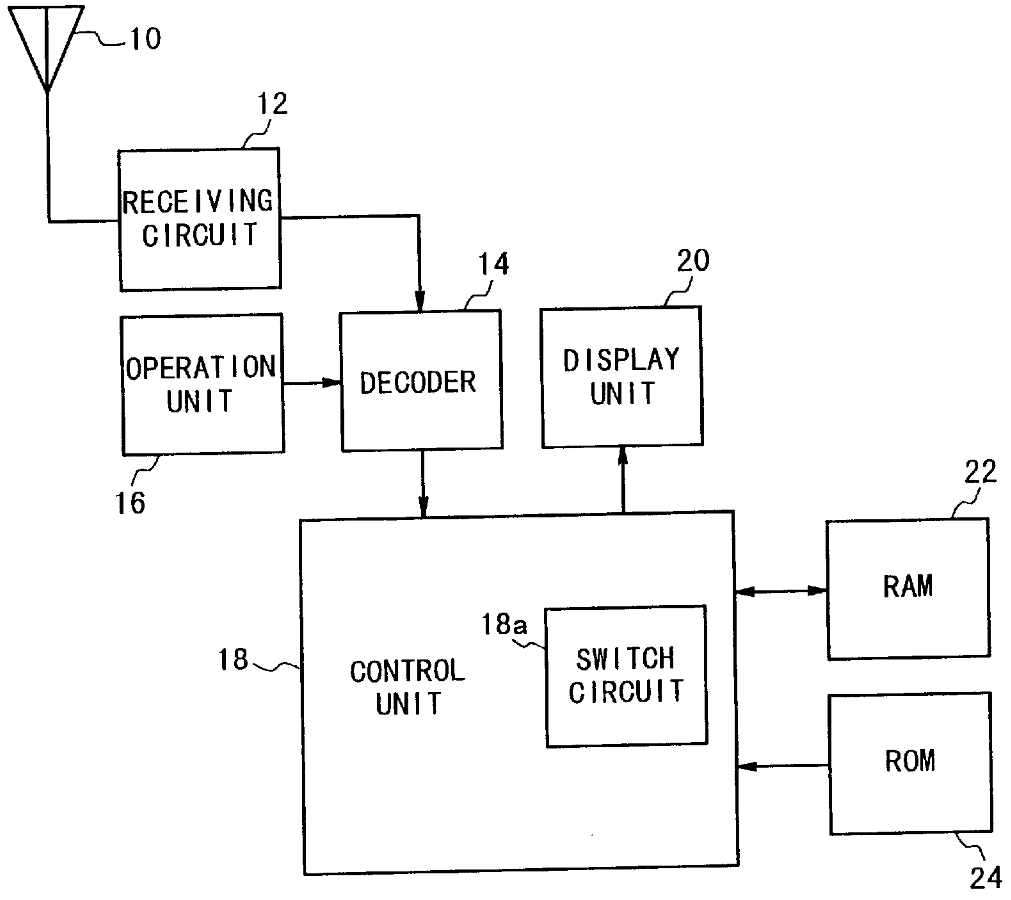
Fig. 1 PRIOR ART
FIG. 1 is a block diagram illustrating the circuit structure of the conventional wireless selective call receiver.
Figure 2:
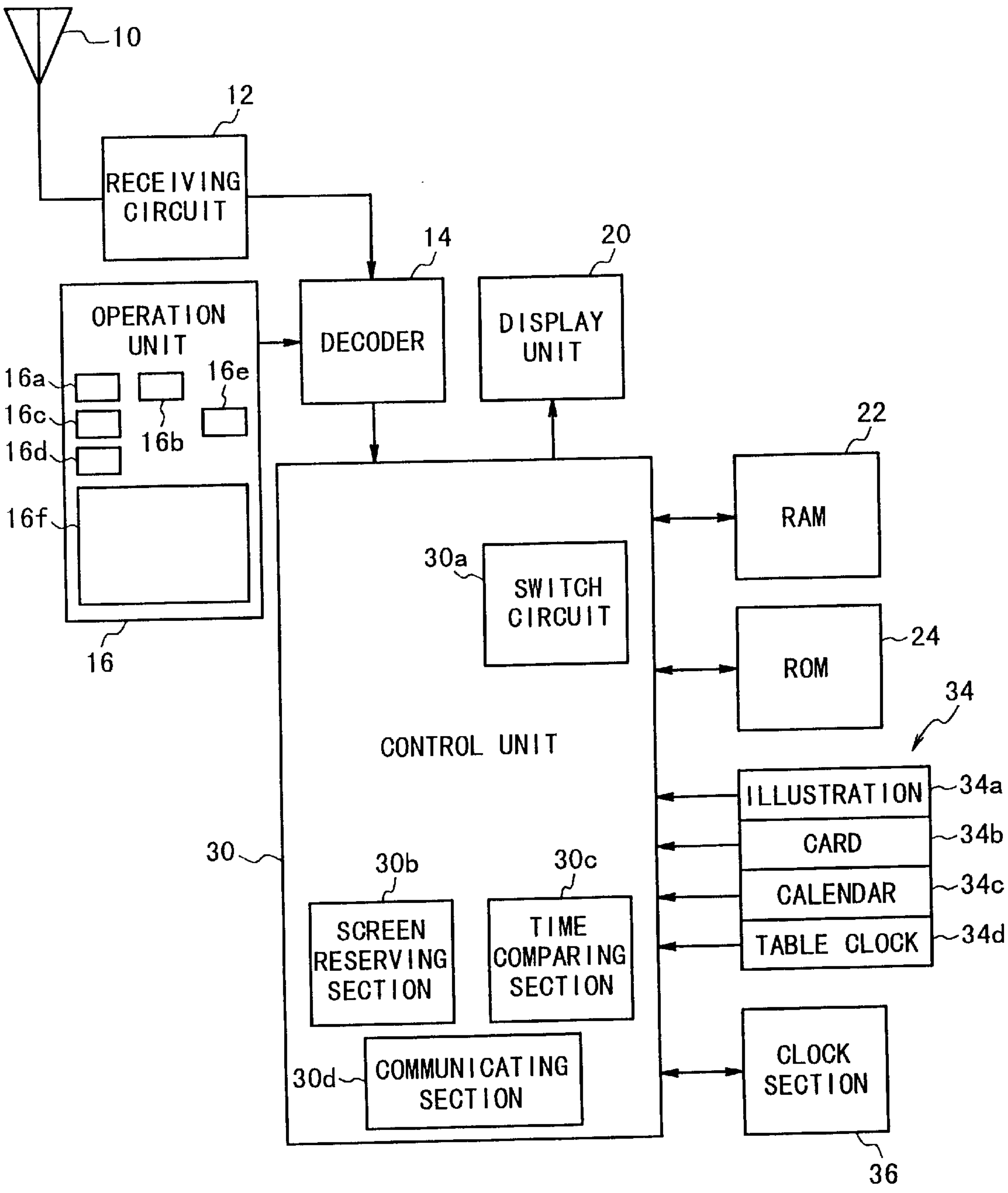
FIG. 2 is a block diagram illustrating the circuit structure of a wireless selective call receiver according to an embodiment of the present invention.

FIG. 2 is a block diagram illustrating the circuit structure of a wireless selective call receiver according to the embodiment of the present invention. Referring to FIG. 2, the wireless selective call receiver of the present invention is composed of an antenna 10, a receiving circuit 12, a decoder 14, an operation unit 16, a control unit 30, a display unit 20, a random access memory (RAM) 22, a read only memory (ROM) 24, a screen display data storing section 34, and a clock section 36.

The antenna 10 receives a radio call signal. The receiving circuit 12 demodulates the radio call signal received by the antenna 10 to convert into a digital signal. The decoder 14 extracts a message signal from the digital signal converted by the receiving circuit 12 to output to the control unit 30. Also, the decoder 14 inputs an operation signal from the operation unit 16 and decodes it to output this operation signal to the control unit 30.

The operation unit 16 includes a key 16*a* for activating a communicating section 30*d* to be described later, a key 16*b* for setting an edit mode, a key 16*c* for selecting one of a plurality of screen display data stored in the screen display data storing section 34, a key 16*d* for setting an time edit mode to allow a display start time to be written in a screen reserving section 30*b* to be described later, a key 16*e* for resetting the edit mode and the time edit mode, and a key section 16*f* used for editing the plurality of screen display data stored in the screen display data storing section 34 and the display start time stored in the screen reserving section 30*b*. The operation unit 16 is operated by a user and outputs the operation signal to the decoder 14 in accordance with the operation by the user.

The RAM 22 stores the above-mentioned message signal and, in addition, stores a screen display data which is to be displayed on the display unit 20 while the receiver is in the reception wait mode.

The ROM 24 stores various programs used to control the operation of the wireless selective call receiver, in addition to image data of each of characters for the above message data.

The screen display data storing section 34 stores the screen display data of an illustration 34*a*, a card 34*b*, a calendar 34*c*, a table clock 34*d* and so on. When the screen display data is the card 34*b*, the user operates the key section 16*f* of the operation unit 16 to input the card. Instead, the card 34*b* may be produced by an external personal computer and inputted through the communicating section 30*d*. The other screen display data may also be produced by the above personal computer and inputted through the communicating section 30*d*.

The clock section 36 counts a time to output a current time to the control unit 30. When, for example, one minute is counted, the clock section 36 generates a timer interrupt to the control section 30.

The control unit 30 is composed of a switch circuit 30*a*, the screen reserving section 30*b*, a time comparing section 30*c*, and a communicating section 30*d*.

The control unit controls various operations of the wireless selective call receiver. When the message signal is outputted from the decoder 14, the control unit 30 stores this message signal in the RAM 22.

Also, the control unit 30 reads the message signal which has been written in the RAM 22 and reads the image data corresponding to the read message signal from the ROM 24 to output to the display unit 20. The above operation is performed based on various programs stored in the ROM 24. When a timer interrupt is inputted from the clock section 36, the control unit reads image data from the ROM 24 based on the current time from the clock section 36. For example, if the current time is 2:30, the image data of "2", ":", "3", and "0" are read out from the ROM 24, and produces a character string image data of "2:30" to output to the display unit 20.

The switch circuit 30*a* switches the screen display among a reception wait display in a reception wait mode, a message display in a message display mode, and a key input screen display in a key input mode. When a radio call signal is not being received by the antenna 10 so that a message signal is not outputted from the decoder 14 to the control unit 30, the switch circuit 30*a* sets the reception wait mode. In the reception wait mode, when a radio call signal is received by the antenna 10, the decoder 14 extracts a message signal from the digital signal which is outputted from the receiving circuit 12, and outputs the extracted message signal to the control unit 30, the switch circuit 30*a* sets the message display mode. Further, when the operation unit 16 is operated so that the operation signal is inputted from the decoder 14, the switch circuit 30a sets the key input mode.

The screen reserving section 30*b* is provided in the control unit 30 and stores the display start time when each of the plurality of screen data stored in the screen data storage section 34 should be displayed. FIG. 6 is a table illustrating an example of the contents which are stored in the screen reserving section 30*b*. As shown in FIG. 6, a plurality of records are stored in the table. Each of the plurality of records is composed of the field C1 which stores a display start time and the field C2 which stores the identifier of the screen display data which should be displayed at the display start time which is stored in the field C1. For example, a record R1 has the content that the screen display data 34*d* of a table clock is displayed at 6:30. These contents are previously stored by operating the operation unit 16 by the user. In this example, only a display start time is stored in the field C1. However, this means that the table clock is displayed from 6:30 to 9:00. In other words, it is the same as the display time zone is stored. Alternatively, a display end time may be inputted.

The time comparing section 30*c* is provided in the control unit 30 and compares the current time which is counted by the clock section 36 and the display start times in the field C1 of the plurality of records which are stored in the screen reserving section 30*b*, in response to a timer interrupt from the clock section 36. When the current time is coincident with one of the times in the field C1, the time comparing section 30*c* outputs a comparison signal including an identifier, i.e., data indicative of one of the plurality of screen display data having the same display start time as the current time. The control unit 30 refers to the screen display data storing section 34 to find the screen display data to be displayed and outputs the found screen display data to the RAM 22. As a result, the screen display data is displayed on the display unit 20.

Figure 4A:
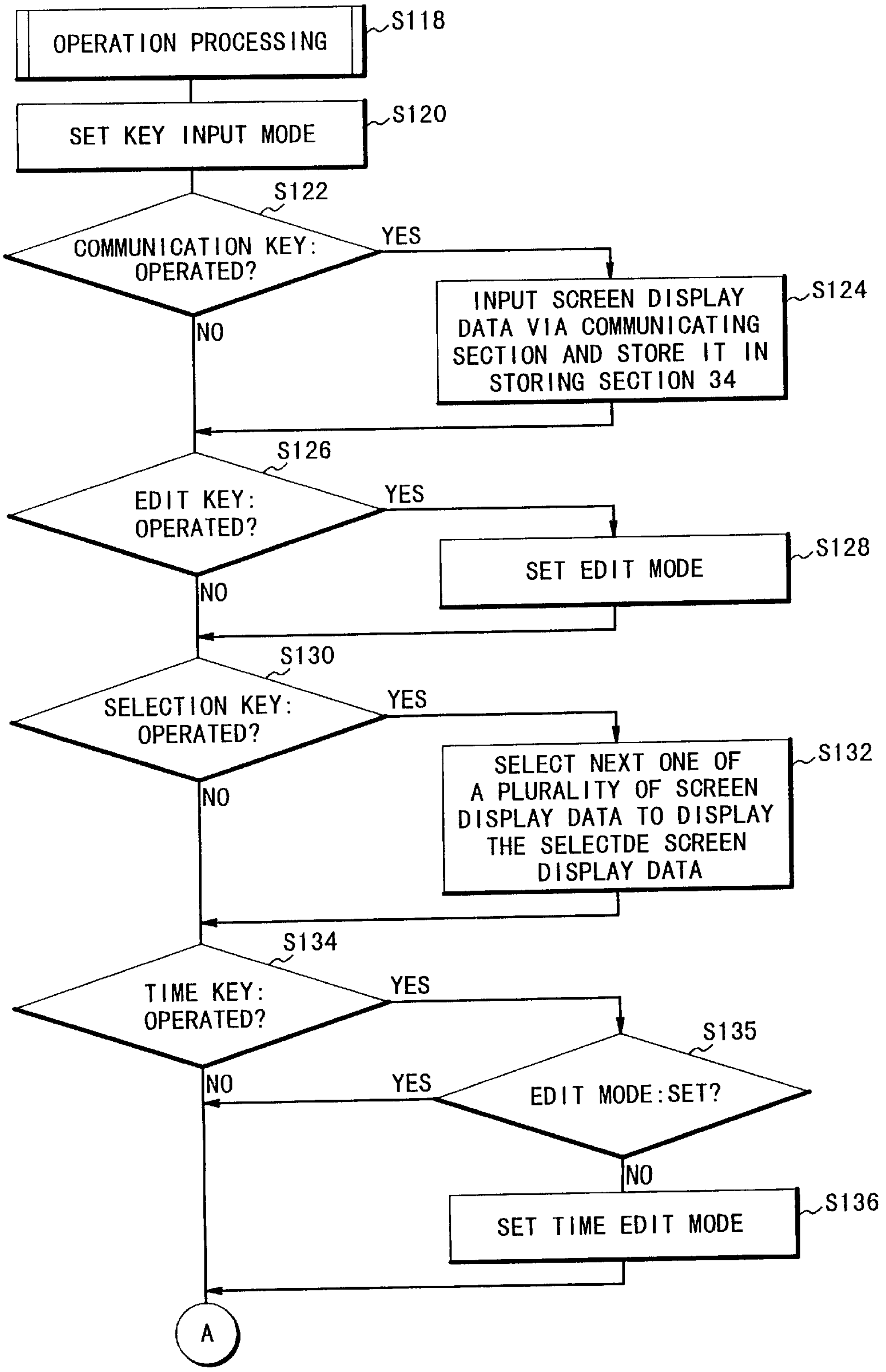
FIGS. 4A and 4B are flow charts illustrating the key input operation in the wireless selective call receiver in the embodiment of FIG. 2.
Figure 4B:
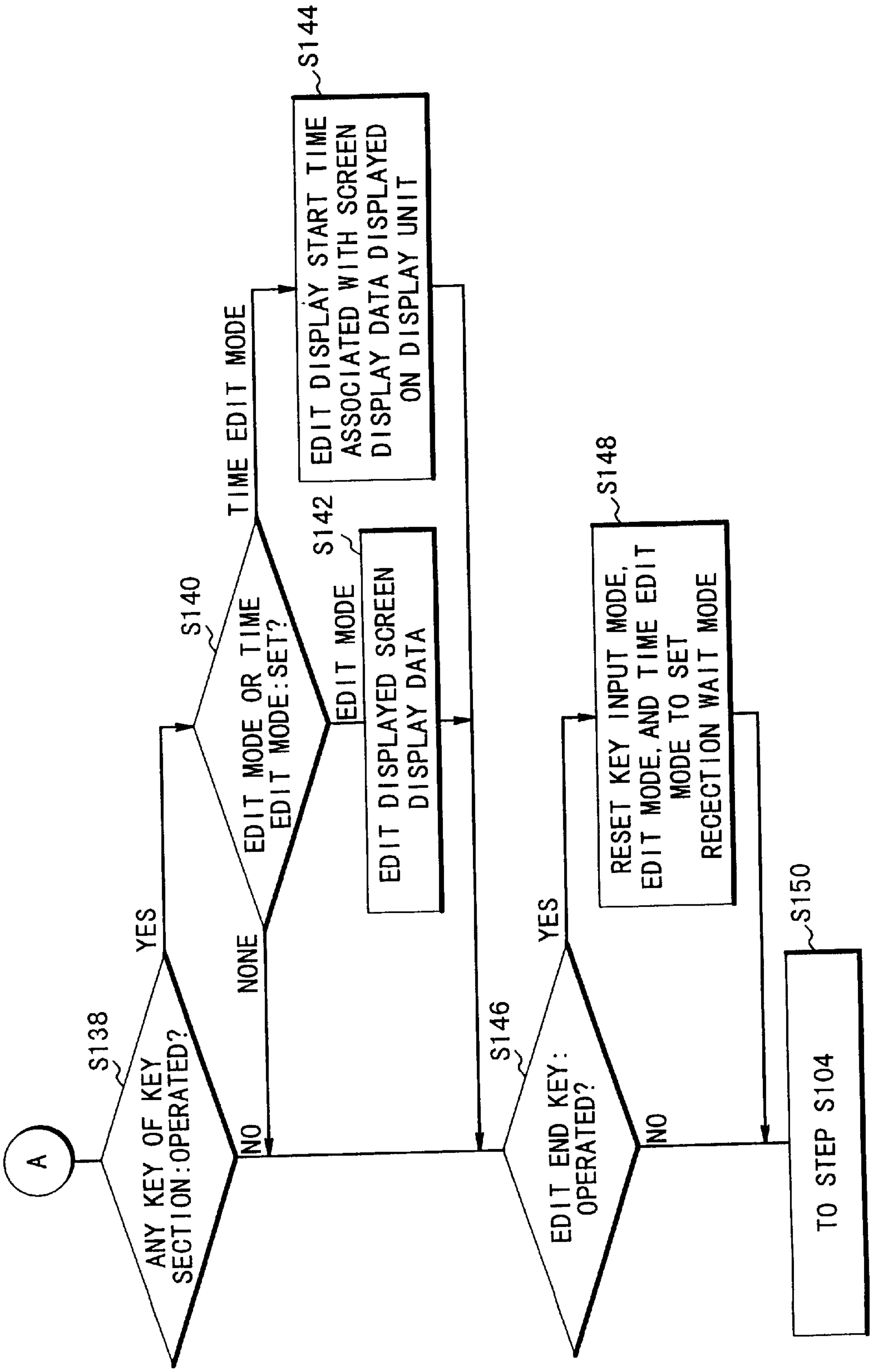
Figure 5:
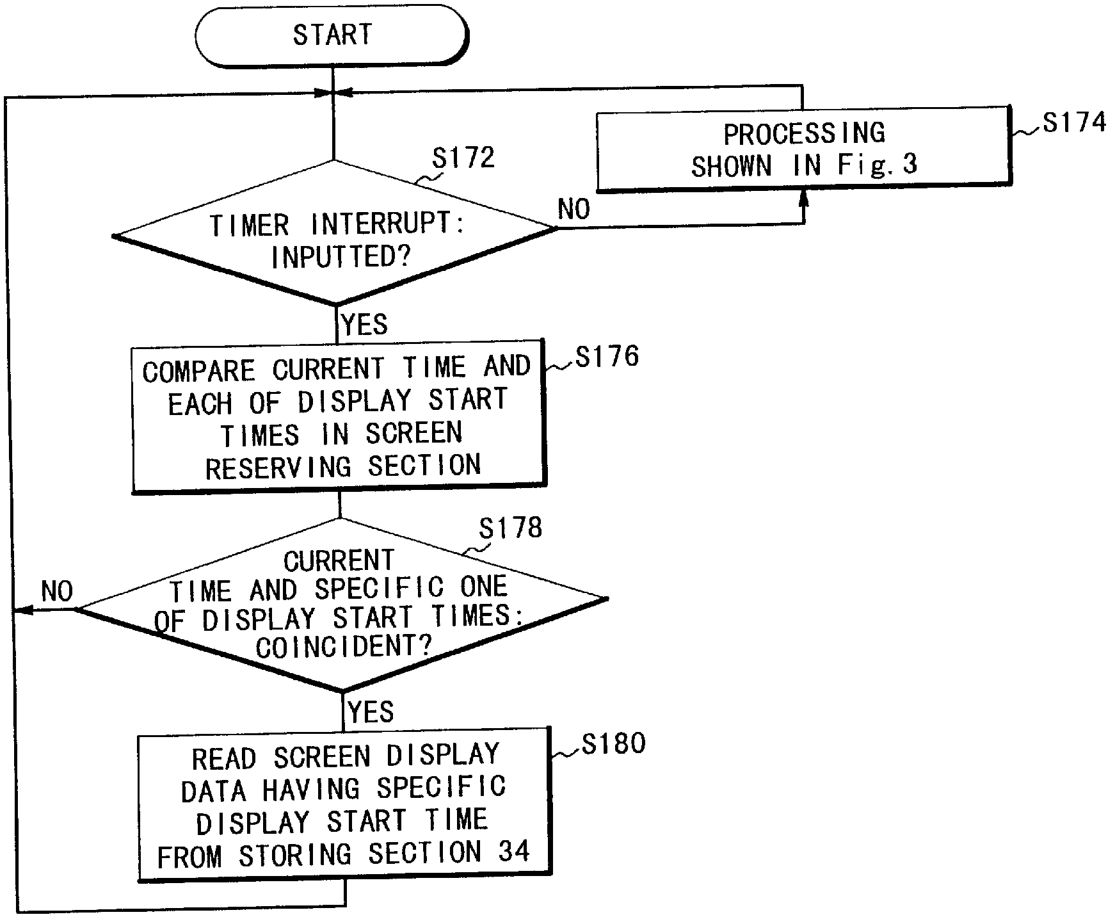
FIG. 5 is a flow chart illustrating the operation for a timer interrupt from a clock section in the wireless selective call receiver in the embodiment of FIG. 2.

Next, the operation of the wireless selective call receiver will be described with reference to FIGS. 3 to 5.

Figure 3:
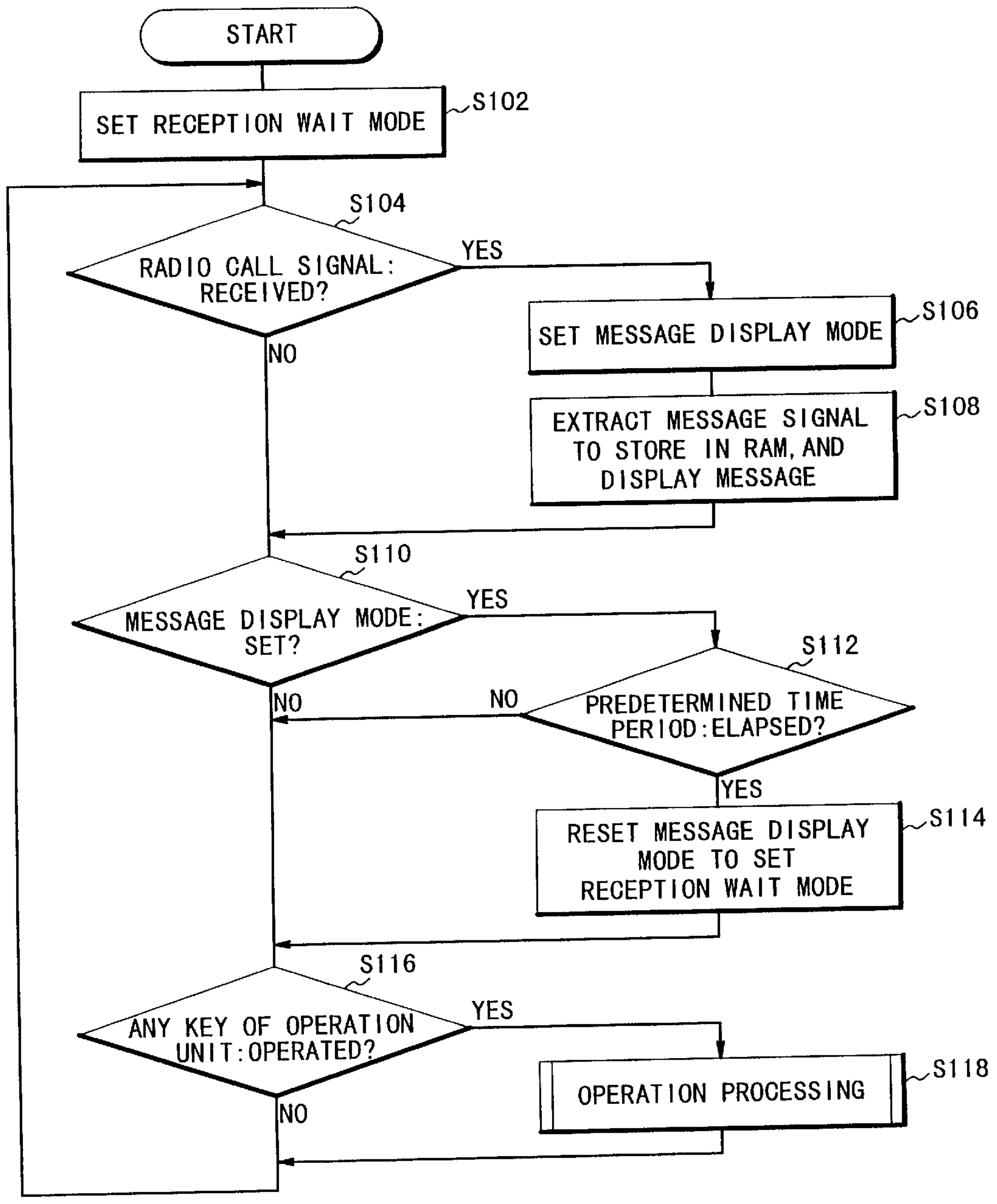
FIG. 3 is a flow chart illustrating the switching operation of screen display in the wireless selective call receiver in the embodiment of FIG. 2.

First, referring to FIG. 3, when the wireless selective call receiver is turned on, the reception wait mode is set by the switch circuit 30*a* in a step S102. Also, the same operation as steps S176 to 180 of the FIG. 5 to be described later is executed. That is, in the reception wait mode, a screen display data stored in the RAM 22 is read by the control unit 30 and outputted to the display unit 20. Thus, the reception wait display is performed on the display unit 20.

Subsequent, in a step S104, it is determined whether a radio call signal is received. If No in the step S104, the control goes to a step S110. When the radio call signal is received by the antenna 10, steps S106 and S108 are executed. That is, the decoder 14 extracts a message signal from the digital signal which is outputted from the receiving circuit 12, and outputs the extracted message signal to the control unit 30. The switch circuit 30*a* sets the message display mode in the step S106. In the step 108, the control unit 30 stores this message signal in the RAM. Subsequently, the control unit 30 refers to the ROM 24 for image data of characters based on the message signal which has been stored in the RAM 22, to produce a character string image data. Then, the control unit 30 stores the character string image data and outputs the character string image data to the display unit 20, so that the message data is displayed on the display unit 20. Then, the control goes to the step S110.

In the step S110, it is determined whether the message display mode is set. If Yes in the step S110, a step S112 is executed to determine whether a predetermined time period elapses from the start of the display of the message data. If Yes in the step S112, the message data is deleted and the switch circuit 30*a* sets the reception wait mode in a step S114. Then, the control unit 30 outputs the screen display data to the display unit 20. Thus, the screen display data which is stored in the RAM 22 is displayed on the display unit 20. Then, the control goes to a step S116. If No in the step S112, the message data continues to be displayed. Then, the step S116 is executed, as in case of No in the step S110.

In the step S116, it is determined whether any key of the operation unit 16 is operated by the user. If yes in the S116, an operation processing S118 which is shown in FIG. 4 is executed. If No in the step S116, the control goes back to the step S104.

Next, the operation processing will be described with reference to FIG. 4. Referring to FIG. 4, when any key of the operation unit 16 is operated by the user, the decoder 14 generates an operation signal to output to the control unit 30. The switch circuit 30*a* sets the key input mode in a step S120.

Subsequently, it is determined in a step S122 whether the key 16*a* is operated. If No in the step S122, the control goes to a step S126. If Yes in the step S122, a step S124 is executed such that the communicating section 30*d* is activated. That is, it is made possible to input a screen display data from an external unit such as a personal computer through the communicating section 30*d*. The inputted screen display data is stored in the screen display data storing section 34. For example, the following screen display data are inputted and stored in the screen display data storing section 34.

Figure 7A:
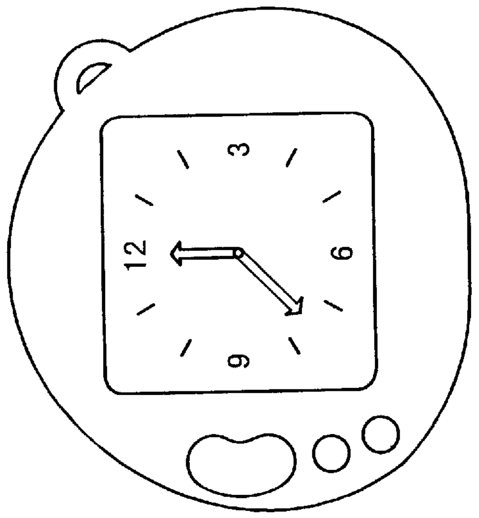
FIGS. 7A to 7C are examples of the contents which are displayed in a reception wait display for personal use.
Figure 7B:
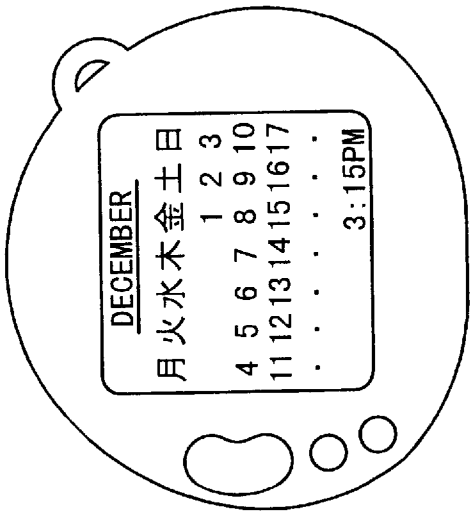
Figure 7C:
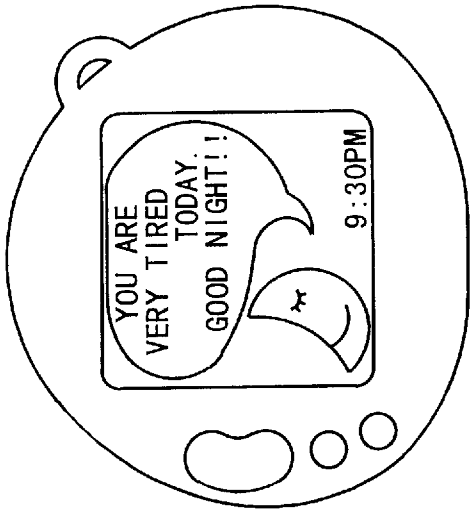
Figure 8A:
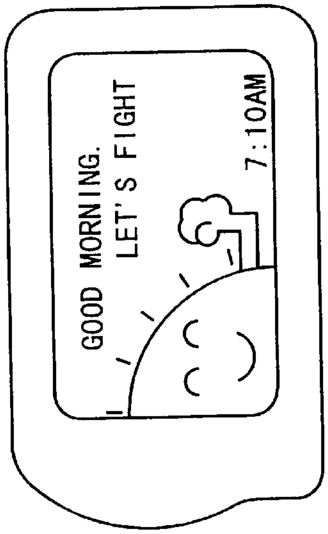
FIGS. 8A to 8C are examples of the contents which are displayed in the reception wait display for business use.
Figure 8B:
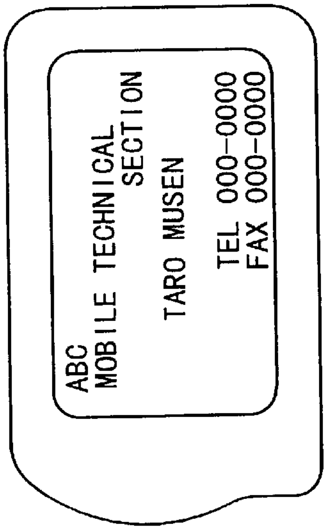
Figure 8C:
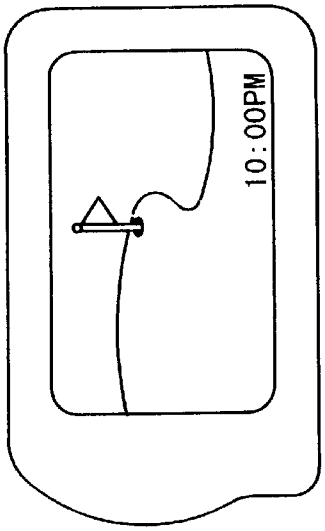

FIGS. 7A to 7C and, FIGS. 8*a* to 8C show examples of the contents which are stored in the screen display data storing section 34 and are displayed on the display unit 20 in the reception wait mode. FIGS. 7A to 7C are personal reception wait displays for a student. FIG. 7A is the screen display data which is displayed in the time zone from 6:30 to 9:00 in the morning and a table clock is displayed. FIG. 7B is the screen display data which is displayed in the time zone from 9:00 to 17:00 and displays a calendar. FIG. 7C is the screen display data which is displayed in the private time zone from 17:00 to 6:30 in the next morning and displays an illustration (with a message of "You are very tired today. Good Night!!").

Also, FIGS. 8A to 8C are reception wait displays for a businessperson. FIG. 8A is the screen display data which is displayed in the time zone from 6:00 to 9:00 and an illustration (with a message of "Good Morning. Let's fight") is displayed. The screen display shown in FIG. 8B, i.e. a card screen display data of the user is displayed in the time zone from 9:00 to 20:00. Also, in the private time zone from 20:00 to 6:00 in the next morning, an illustration screen display of the hobby is displayed, as shown in FIG. 8C.

Note that the screen display data are shown as the outer appearance image such that it is easy to understood the design in FIGS. 7A to 7C and FIGS. 8A to 8C.

In the step S126, it is determine whether the key 16*b* is operated. If No in the step S126, the control goes to a step S130. If Yes in the step S126, a step S128 is executed such that an edit mode is set. Then, the control goes to a step S130.

In the step S130, it is determined whether the key 16*c* is operated. If No in the step S130, the control goes to a step S134. If Yes in the step S130, the next one of the plurality of screen display data is selected. The selected screen display data is outputted to the RAM 22 such that it is displayed on the display unit 20. That is, when the user operates the key 16*c* of the operation unit 16, the switch circuit 30*a* outputs the screen display data which has been stored in screen data storage section 34 to the display unit 20 in accordance with the operation of the key 16*c* of the operation unit 16. By repeating this operation, a desired screen display data can be displayed.

In the step the S134, it is determined whether the key 16*d* is operated. If No in the step S134, the control goes to a step S138. If Yes in the step S134, it is determined in a step S135 whether the edit mode is set. If No in the step S135, the control goes to the step S138. If Yes in the step S135, a time edit mode is set in a step S136.

In the step S138, it is determined whether any one of the key section 16f is operated. If No in the step S138, then the control goes to a step S146. If Yes in the step S138, it is determined in a step S140 whether the edit mode or the time edit mode is set. If the edit mode and the time edit mode are both not set, the control goes to the step 146. When the edit mode is set, the screen display data displayed on the display unit 20 is edited in response to the operation of the key section 16f in a step S142. In this case, screen display data is not displayed, a new screen display data can be produced. On the other hand, when the time edit mode is set, the screen reserving section 30*b* is referred to specify one of the records stored therein and the display start time corresponding to the screen display data displayed on the display unit 20 is edited in response to the operation of the key section 16*f* in a step S144. If the display start time is not yet inputted, a new display start time is stored to be associated with the screen display data displayed on the display unit 20. Thereafter, the control goes to the step S146.

In the step S146, it is determined whether the key 16*e* is operated. If No in the step S146, the control goes back to the step S122. If Yes in the step S146, the edit mode or the time edit mode is reset to set the reception wait mode in a step S148. Then, the control returns to the step S104 of FIG. 3.

In the above processing, if the key 16*c* is operated and then the key 16*e* is operated, even though the screen display data specified by the current time and the display start time is displayed, a new screen display data can be displayed.

Next, the operation when a timer interrupt is generated from the clock section 36 will be described with reference to FIG. 5.

In a step S172, it is determined whether the timer interrupt is generated from the clock section 36 to indicate a current time. If No in the step S172, the processing shown in FIG. 3 is executed again.

If Yes in the step S172, the time comparing section 30*c* first searches the fields C1 of the plurality of records which has been stored in the screen reserving section 30*b* using as a key the current time outputted from the clock section 36. The time comparing section 30*c* compares the current time and each of the times which are stored in the field C1 and outputs a comparison signal indicative of the kind of the screen display data which is to be displayed in the current time. For example, as shown in FIG. 6, if the current time is 9:30, the time comparing section 30*c* outputs the comparison signal indicative of a calendar. The control unit 30 reads the calendar 34*c* from the screen display data storing section 34 based on this comparison signal and outputs to the display unit 20.

When the time passes and the current time reaches 17:00, the time comparing section 30*c* searches the fields C1 of the plurality of records which has been stored in the screen reserving section 30*b* to compare the current time and each of the times which are stored in the fields C1 of the plurality of records. As a result, as shown in FIG. 6, the time comparing section 30*c* outputs the comparison signal indicative of the kind of the screen display data to be displayed at the current time. In this case, the comparison signal indicative of the illustration which has been stored as the record R3 is outputted. Then, the control unit 30 reads the illustration 34*a* from the screen display data storing section 34 to output to the display unit 20. In this way, in the reception wait mode, the display of the screen can be switched based on the display start times which have been stored in the screen reserving section 30*b*. Note that if a message signal is received in the reception wait mode, the mode is switched to the message display mode, as described above. When a predetermined time period passes after a message is displayed, the display is switched to the original reception wait mode to display the screen display data stored in the RAM 22.

As described above, in the wireless selective call receiver of the present invention, a screen display data is displayed on the display unit in a reception wait mode. Because the display can be seen as a part of the outer appearance design, there is an effect that attractive outer appearance can be provided.

Also, the screen display data can be switched based on the current time and the display start times and the wireless selective call receiver plays a role for the information provision in the reception wait mode. Therefore, it is made possible to provide the wireless selective call receiver functioning as a clock and to show more attractive outer appearance to another person.

Further, because the screen display data can be set to the desired content to the user and the display time zone of the screen display data can be freely set, there is an effect that the wireless selective call receiver can be applied to various purposes.

What is claimed is:

1. A wireless selective call receiver comprising:

a display section for displaying a screen display data inputted thereto;

a screen display data storage section for storing a plurality of screen display data which are to be displayed in a reception wait state;

a control section for outputting a selected one of the plurality of screen display data to said display section; and a clock section for counting time to output a current time;

wherein each of the plurality of screen display data is associated with a time period, and wherein said control section selects the one of the plurality of screen display data in accordance with the time periods and the current time and outputs the selected screen display data to said display section.

2. A wireless selective call receiver according to claim 1, wherein said control section inputs another screen display data from an external device and writes the other screen display data in said screen display data storage section.

3. A wireless selective call receiver according to claim 1, further comprising:

a reserving section for storing the time period associated with each of the plurality of screen display data; and a comparing section for comparing each of the time periods stored in said reserving section and the current time supplied from the clock section, and generating a selection signal when the current time is contained within one of the time periods stored in said reserving section, and wherein said control section selects the one of the plurality of screen display data which is associated with the time period in which the current time is contained, in response to the selection signal and outputs the selected screen display data to said display section.

4. A wireless selective call receiver according to claim 3, further comprising an operation section for generating a data designating signal and a time period edition signal in accordance with an operation of the operation section by a user, and wherein said control section edits the time period associated with one of the plurality of screen display data which is designated in accordance with the data designating signal, in response to the time period edition signal.

5. A wireless selective call receiver according to claim 1, further comprising an operation section for generating a data designating signal and a display signal in accordance with an operation of said operation section by a user, and wherein said control section selects the one of the plurality of screen display data in accordance with the data designating signal; and outputs the selected screen display data to said display section in response to the display signal.

6. A wireless selective call receiver according to claim 1, further comprising an operation section for generating a data designating signal and a data edition signal in accordance with an operation of said operation section by a user, and wherein said control section selects the one of the plurality of screen display data in accordance with the data designating signal and edits the selected screen display data in response to the data edition signal.

7. A method of displaying a desired screen display data in a wireless selective call receiver, comprising the steps of:

receiving a message signal in a message receiving mode to display a message corresponding to the received message signal on a display unit;

previously providing a plurality of screen display data, each of the plurality of screen data being associated with a time period; and displaying a selected one of the plurality of screen data on the display unit in a reception waiting mode by selecting the one of the plurality of screen display data in accordance with the time periods and a current time supplied from a clock section.

8. A method according to claim 7, further comprising the step of switching from the message receiving mode to the reception waiting mode after a predetermined time period elapses from the display of the message.

9. A method according to claim 7, further comprising the step of adding another screen display data to the plurality of screen display data which are already provided from an external device.

10. A method according to claim 7, further comprising the step of associating each of the plurality of screen display data with the time period during which said screen display is displayed, and wherein said selecting step includes:

comparing each of the time periods associated with the plurality of screen display data and the current time supplied from the clock section; and selecting the one of the plurality of screen display data such that the current time is within the time period associated with the selected screen display data.

11. A method according to claim 7, further comprising the step of editing the time period for each of the plurality of screen display data in response to an operation of an operation unit.

12. A method according to claim 7, further comprising the step of selecting and displaying another of the plurality of screen display data in response to an operation of an operation unit, regardless of the time period of the other screen display data.

13. A method according to claim 7, further comprising the step of selectively editing the plurality of screen display data in response to an operation of an operation unit.

14. A wireless selective call receiver, comprising:

a display section for displaying data inputted thereto;

a receiving section for receiving a message signal in a message receiving mode;

a storing section for storing a plurality of screen display data;

a control section for outputting a message data corresponding to the received message signal on said display section in the message receiving mode, and outputting a selected one of the plurality of screen display data to said display section in a reception waiting mode;

a time period storing section for storing a time period associated with each of the plurality of screen display; and a clock section for counting a time to output a current time wherein said control section selects one of the plurality of screen display data in accordance with the time periods for the plurality of screen display data and a current time supplied from said clock section.

15. A wireless selective call receiver according to claim 14, wherein said control section switches from the message receiving mode to the reception waiting mode after a predetermined time period elapses from the display of the message data.

16. A wireless selective call receiver according to claim 14, further comprising a communication section for communicating with an external unit, and wherein the control section inputs another screen display data through said communication section from the external unit to store the other screen display data in said storing section.

17. A wireless selective call receiver according to claim 14, further comprising an operation section for generating a time period edit instruction, and wherein said control section edits the time period associated with a specific one of the plurality of screen display data in response to the time period edit instruction.

18. A wireless selective call receiver according to claim 14, further comprising an operation section for generating a data edit instruction, and wherein said control section edits a specific one of the plurality of screen display data in response to the data edit instruction.

19. A wireless selective call receiver according to claim 14, wherein each of the plurality of screen display data is one of an illustration data, a card data, a calendar data, and a table clock data.

* * * * *